United States Patent Office 3,444,215
Patented May 13, 1969

3,444,215
PREPARATION OF COMPOUNDS OF THE 1,4-DIANILINO - 5 - NITRO - 8 - HYDROXY-ANTHRAQUINONE SERIES
Gunter Gehrke, Cologne-Flittard, Germany, assignor to Farbenfabriken Bayer Aktiengesellschaft, Leverkusen, Germany, a corporation of Germany
No Drawing. Continuation of abandoned application Ser. No. 405,621, Oct. 21, 1964. This application Sept. 22, 1967, Ser. No. 669,974
Claims priority, application Germany, Nov. 2, 1963, F 41,170
Int. Cl. C09b *3/12;* D06p *1/20*
U.S. Cl. 260—380                     6 Claims

ABSTRACT OF THE DISCLOSURE 1,4-diarylamino-5-nitro-8-hydroxy-anthraquinones are produced by reacting 1,8-dihydroxy-5-nitro-anthraquinones substituted in the 4-position by an arylamino moiety with a primary arylamine at a temperature of from 100° C. to 200° C. in the presence of boric acid, said arylamine being a benzene series compound or a benzene series compound substituted by alkyl, alkoxy or halogen. The resulting anthraquinone is useful as a dyestuff.

---

This application is a continuation of S.N. 405,621, filed Oct. 21, 1964, and now abandoned.

This invention relates to 1,4-diarylamino-5-nitro-8-hydroxy-anthraquinones and to a process for their production and use.

It has been found that by reacting 1,8-dihydroxy-5-nitro-anthraquinones substituted in the 4-position by a nitro or arylamino group, with arylamines in the presence of boric acid, there are obtained 1,4-diarylamino-5-nitro-8-hydroxy-anthraquinones. In the presence of boric acid, the second nitro group, surprisingly, does not react at all with the arylamine, only the hydroxy group in the p-position to the arylamine being converted, and, instead of the expected blue 1,8-dihydroxy-4,5-diarylamino-anthraquinones, the green 1,4-diarylamino-5-nitro-8-hydroxy-anthraquinones result in very good yield and high quality. This reaction is the more surprising as 1,5-dihydroxy-4,8-diarylamino-anthraquinones are obtained from 1,5-dihydroxy-4,8-dinitro-anthraquinone with arylamines also in the presence of boric acid.

The reactions can be carried out in inert organic diluents but it is preferable to work with the use of an excess of the arylamine as solvent at temperatures between about 100 and 200° C.

The arylamines are preferably benzene derivatives which may be substituted, for example by alkyl or alkoxy groups containing preferably lower alkyl groups or by halogen, such as e.g. aniline, toluidines, xylidines, ethyl anilines, propyl anilines, butyl anilines, anisidines, phenetidines, chloroanilines and the like.

The boric acid is preferably used in amounts of about 5 to 50 percent by weight, referred to the anthraquinone derivative. The 1,4-diarylamino-5-nitro-8-hydroxy-anthraquinones obtainable by the process according to the invention dissolve with a clear green colour in chloroform or pyridine. They are valuable dyestuff intermediates or can also be used themselves as dyestuffs, for example as dispersion dyestuffs for synthetic fibres.

The following examples are given for the purpose of illustrating the invention.

Example 1

20 parts of 1,8-dihydroxy-4,5-dinitro-anthraquinone are stirred with 2 parts of boric acid in 100 parts of aniline at 150° C. for about 6 hours, until the solution no longer becomes greener. The solution is then allowed to cool, diluted with 200 parts of methanol, the product is filtered off with suction, washed with 200 parts of methanol and dried. 22 parts of 1,4-dianilino-5-nitro-8-hydroxy-anthraquinone are obtained in the form of green feathered crystal needles.

By reacting the toluidines, xylidines, ethyl anilines, propyl anilines, butyl anilines, anisidines, phenetidines or chloroanilines in the same manner, the corresponding 1,4-diarylamino - 5 - nitro-8-hydroxy-anthraquinones are obtained. Thereby for example the following compounds are obtained:

| Example | Reaction product |
|---|---|
| 2 | 1,4-di-o-toluidino-5-nitro-8-hydroxy-anthraquinone. |
| 3 | 1,4-di-m-toluidino-5-nitro-8-hyroxy-anthraquinone. |
| 4 | 1,4-di-p-toluidino-5-nitro-8-hydroxy-anthraquinone. |
| 5 | 1,4-di-o-ethylanilino-5-nitro-8-hydroxy-anthraquinone. |
| 6 | 1,4-di-m-ethylanilino-5-nitro-8-hydroxy-anthraquinone. |
| 7 | 1,4-di-p-ethylanilino-5-nitro-8-hyroxy-anthraquinone. |
| 8 | 1,4-di-o-n-propylanilino-5-nitro-8-hydroxy-anthraquinone. |
| 9 | 1,4-di-p-n-propylanilino-5-nitro-8-hydroxy-anthraquinone. |
| 10 | 1,4-di-o-isopropylanilino-5-nitro-8-hydroxy-anthraquinone. |
| 11 | 1,4-di-p-isopropylanilino-5-nitro-8-hydroxy-anthraquinone. |
| 12 | 1,4-di-m-tert.-butylanilino-5-nitro-8-hydroxy-anthraquinone. |
| 13 | 1,4-di-p-tert.-butylanilino-5-nitro-8-hydroxy-anthraquinone. |
| 14 | 1,4-di-o-n-butylanilino-5-nitro-8-hydroxy-anthraquinone. |
| 15 | 1,4-di-m-n-butylanilino-5-nitro-8-hydroxy-anthraquinone. |
| 16 | 1,4-di-p-n-butylanilino-5-nitro-8-hydroxy-anthraquinone. |
| 17 | 1,4-di-o-anisidino-5-nitro-8-hydroxy-anthraquinone. |
| 18 | 1,4-di-m-anisidino-5-nitro-8-hydroxy-anthraquinone. |
| 18 | 1,4-di-m-anisidino-5-nitro-8-hydroxy-anthraquinone. |
| 19 | 1,4-di-p-anisidino-5-nitro-8-hydroxy-anthraquinone. |
| 20 | 1,4-di-o-phenetidino-5-nitro-8-hydroxy-anthraquinone. |
| 21 | 1,4-di-m-phenetidino-5-nitro-8-hydroxy-anthraquinone. |
| 22 | 1,4-di-p-phenetidino-5-nitro-8-hydroxy-anthraquinone. |
| 23 | 1,4-di-o-chloroanilino-5-nitro-8-hydroxy-anthraquinone. |
| 24 | 1,4-di-m-chloroanilino-5-nitro-8-hydroxy-anthraquinone. |
| 25 | 1,4-di-p-chloroanilino-5-nitro-8-hydroxy-anthraquinone. |
| 26 | 1,4-di-as-o-xylidino-5-nitro-8-hydroxy-anthraquinone. |
| 27 | 1,4-di-symm-m-xylidino-5-nitro-8-hydroxy-anthraquinone. |
| 28 | 1,4-di-p-xylidino-5-nitro-8-hyroxy-anthraquinone |
| 29 | 1,4-di-xylidino-5-nitro-8-hydroxy-anthraquinone. |

Example 30

20 parts of 1,8-dihydroxy-4,5-dinitro-anthraquinone are stirred with 100 parts of p-toluidine at 150° C. for about ½ hour. To the blue solution of the resultant 1,8-dihydroxy - 4-p-toluidino-5-nitro-anthraquinone there are then added 5 parts of boric acid and stirring is continued at 150° C. for about 4 hours, until the solution no longer becomes greener. After working up as described in Example 1, 23 parts of 1,4-di-p-toluidino-5-nitro-8-hydroxy-anthraquinone are obtained.

A fabric of polyester fibres (polyethylene glycol terephthalate) is impregnated on the foulard with a liquor containing per liter 20 g. of the above dyestuff which was previously finely dispersed in the presence of dispersing agents. The fabric is then squeezed off to a weight increase of about 70% and dried at 100° C. For fixation of the dyeing, the fabric is subsequently treated at 190–210° C. with hot air for 60 seconds, rinsed, washed hot and dried. An intense green dyeing is thus obtained, with excellent fastness to light and fastness to sublimation.

In a corresponding manner there can be dyed the dyestuffs described in Examples 1–29.

What is claimed is:

1. A process for the production of 1,4-diarylamino-5-nitro-8-hydroxy-anthraquinones, which comprises reacting a 1,8-dihydroxy-5-nitro-anthraquinone substituted in the 4-position by a member selected from the group consisting of nitro and arylamino with a primary arylamine at a temperature of 100° C. to 200° C. in the presence of boric acid, said arylamine being a benzene series compound or a benzene series compound substituted by alkyl, alkoxy or halogen.

2. The process according to claim 1 which comprises reacting 1,8-dihydroxy-4,5-dinitro-anthraquinone with p-toluidine.

3. The process according to claim 1 which comprises reacting 1,8-dihydroxy-4,5-dinitro-anthraquinone with m-toluidine.

4. A process according to claim 1 which comprises reacting 1,8-dihydroxy-4,5-dinitro-anthraquinone with o-toluidine.

5. A process according to claim 1 which comprises reacting 1,8 - dihydroxy - 4,5 - dinitro-anthraquinone with aniline.

6. The process according to claim 1 wherein the arylamine is present in an amount in excess of that required for reaction.

References Cited

UNITED STATES PATENTS 3,082,218   3/1963   Buxhaum et al.

FOREIGN PATENTS 23,927   1895   Great Britain.

LORRAINE A. WEINBERGER, *Primary Examiner.*

H. C. WEGNER, *Assistant Examiner.*

U.S. Cl. X.R.

8—39